United States Patent
Chen

(10) Patent No.: US 9,916,287 B2
(45) Date of Patent: Mar. 13, 2018

(54) METHOD, DEVICE AND SYSTEM FOR ZOOMING FONT IN WEB PAGE FILE, AND STORAGE MEDIUM

(71) Applicant: TENCENT TECHNOLOGY (SHENZHEN) COMPANY LIMITED, Shenzhen, Guangdong (CN)

(72) Inventor: Mingqin Chen, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 902 days.

(21) Appl. No.: 14/256,625

(22) Filed: Apr. 18, 2014

(65) Prior Publication Data

US 2014/0372870 A1 Dec. 18, 2014

Related U.S. Application Data

(63) Continuation of application No. PCT/CN2013/089110, filed on Dec. 11, 2013.

(30) Foreign Application Priority Data

Jun. 17, 2013 (CN) .......................... 2013 1 0239721

(51) Int. Cl.
G06F 17/00 (2006.01)
G06F 17/21 (2006.01)
G06F 3/0484 (2013.01)

(52) U.S. Cl.
CPC .......... G06F 17/214 (2013.01); G06F 3/0484 (2013.01); G06F 2203/04806 (2013.01)

(58) Field of Classification Search
None
See application file for complete search history.

(56) References Cited

U.S. PATENT DOCUMENTS 7,385,615 B2 * 6/2008 Vale ........................ G09G 5/005
345/441
7,768,536 B2 * 8/2010 Hyatt .................... G06F 3/0481
345/619

(Continued)

FOREIGN PATENT DOCUMENTS

| CN | 102789455 A | 11/2012 |
|----|-------------|---------|
| CN | 102968474 A | 3/2013 |
| CN | 103064920 A | 4/2013 |

OTHER PUBLICATIONS

International Search Report issued in corresponding International Application No. PCT/CN2013/089110 dated Mar. 20, 2014.

*Primary Examiner* — Howard Cortes
(74) *Attorney, Agent, or Firm* — Sughrue Mion, PLLC

(57) ABSTRACT

Disclosed is a method, a device and a system for zooming a font in a web page file, and the method includes: receiving a web page file; parsing and recognizing the web page file, to classify text contained in the web page file into a first group of zoomable text and a second group of unzoomable text; detecting a zoom operation performed on the web page file displayed at a mobile terminal; and upon the detection of the zoom operation, zooming the first group of text in the web page file except for the second group of text in the web page file. With the method, the problem that the text in a web page file are overlapped due to zooming is avoided, and the typesetting of the web page may be reasonable, without degrading the experience of the user in browsing the web page.

8 Claims, 3 Drawing Sheets

(56) References Cited

U.S. PATENT DOCUMENTS

| | | | | |
|---|---|---|---|---|
| 8,307,279 B1* | 11/2012 | Fioravanti | ............ | G06F 9/4443 |
| | | | | 715/235 |
| 8,612,850 B2* | 12/2013 | Huang | .................... | G09G 5/14 |
| | | | | 715/204 |
| 9,128,596 B2* | 9/2015 | Oygard | ................. | G06F 3/0485 |
| 2007/0050712 A1* | 3/2007 | Hull | ...................... | G06F 17/212 |
| | | | | 715/234 |
| 2007/0198917 A1* | 8/2007 | Rohrabaugh | ......... | G06F 9/4443 |
| | | | | 715/234 |
| 2011/0072390 A1* | 3/2011 | Duga | ................... | G06F 3/0481 |
| | | | | 715/800 |
| 2011/0202829 A1* | 8/2011 | Klassen | ............ | G06F 17/30905 |
| | | | | 715/243 |
| 2012/0001914 A1* | 1/2012 | Pan | ................... | G06Q 30/0241 |
| | | | | 345/428 |
| 2012/0110438 A1* | 5/2012 | Peraza | ................. | G06F 17/214 |
| | | | | 715/243 |
| 2012/0131446 A1* | 5/2012 | Park | ................ | H04M 1/72561 |
| | | | | 715/238 |
| 2012/0257035 A1* | 10/2012 | Larsen | .................... | G06F 3/017 |
| | | | | 348/78 |
| 2012/0268369 A1* | 10/2012 | Kikkeri | ................... | G06F 3/038 |
| | | | | 345/157 |
| 2012/0311487 A1* | 12/2012 | Staikos | ................... | G06F 3/048 |
| | | | | 715/800 |
| 2015/0070373 A1* | 3/2015 | Clinton | ................. | G06F 17/214 |
| | | | | 345/589 |
| 2015/0212694 A1* | 7/2015 | Ho | ..................... | G06F 3/04842 |
| | | | | 715/800 |

* cited by examiner

METHOD, DEVICE AND SYSTEM FOR ZOOMING FONT IN WEB PAGE FILE, AND STORAGE MEDIUM

CROSS-REFERENCE TO RELATED APPLICATION

This application is a continuation application of PCT Patent Application No. PCT/CN2013/089110, entitled "METHOD, DEVICE AND SYSTEM FOR ZOOMING FONT IN WEB PAGE FILE, AND STORAGE MEDIUM" filed on Dec. 11, 2013, which claims priority to Chinese Patent Application No. 201310239721.3, entitled "METHOD, DEVICE AND SYSTEM FOR ZOOMING FONT IN WEB PAGE" filed on Jun. 17, 2013, both of which are incorporated by reference in their entirety.

FIELD

The present disclosure relates to the field of computer technologies, specifically to the field of Internet technologies, and more specifically to a method, a device and a system for zooming a font in a web page file, and a storage medium.

BACKGROUND

With the development of communication technologies, especially Internet technologies, the network bandwidth obtainable by a user increases continuously, more and more network applications emerge, and the combination of network applications with mobile terminals becomes more and more popular. Therefore, it has become one of hot spots of researches and developments in the current network application field how to develop a more friendly interaction interface between the user and the mobile terminal.

At present, when a web page is browsed at a mobile terminal, because the size of the display screen of the mobile terminal is relatively small and most ordinary web pages are designed for relatively large PC screens, the web page interested by the user might be partially displayed on the display screen of the mobile terminal. Therefore, the user has to zoom the web page for fully browsing the web page or for other purposes such as the need of amplifying a picture. However, for the current browser that is designed for the mobile terminal, the fonts in the web page is either entirely zoomed, causing problems such as overlapping between text and between text and background pictures, or not zoomed at all, causing inconvenience for the browsing of the user.

SUMMARY

In view of this, the embodiments of the disclosure provide a method, a device and a system for zooming a font in a web page file, to solve the above technical problem in the prior art.

In an aspect, an embodiment of the disclosure provides a method for zooming a font a web page file displayed at a mobile terminal, comprising steps of:
receiving a web page file;
parsing and recognizing the web page file, to classify text contained in the web page file into a first group of zoomable text and a second group of unzoomable text;
detecting a zoom operation performed on the web page file displayed at the mobile terminal; and
upon the detection of the zoom operation, zooming the first group of text in the web page file except for the second group of text in the web page file.

Correspondingly, an embodiment of the disclosure further provides a device for zooming a font in a web page file displayed at a mobile terminal, comprising:
a receiving module, which is configured for receiving a web page file;
a parsing and recognizing module, which is configured for parsing and recognizing the web page file, to classify text contained in the web page file into a first group of zoomable text and a second group of unzoomable text;
a detecting nodule, which is configured for detecting a zoom operation performed on the web page file displayed at a mobile terminal; and
a zooming module, which is configured for zooming the first group of text ire the web page file except for the second group of text in the web page file, upon the detection of the zoom operation.

Correspondingly, an embodiment of the disclosure further provides a system for zooming a font in a web page file, comprising a server and at least one client terminal, wherein:
the server is configured to transfer a web page file to the client terminal;
the client terminal is configured to parse and recognize the web page file, to classify text contained in the web page file into a first group of zoomable text and a second group of unzoomable text;
the client terminal is further configured to detect zoom operation performed on the web page file displayed; and
upon the detection of the zoom operation, the client terminal zooms the first group of text in the web page file except for the second group of text in the web page file.

Correspondingly, an embodiment of the disclosure further provides a storage medium containing computer-executable instructions, which, when executed by a computer processor, are configured to perform the above method for zooming a font in a. web page file displayed at a mobile terminal, wherein the method comprises steps of:
receiving a web page file;
parsing and recognizing the web page file, to classify text contained in the web page file into a first group of zoomable text and a second group of unzoomable text;
detecting a zoom operation performed on the web page file displayed at a mobile terminal; and
upon the detection of the zoom operation, zooming the first group of text in the web page file except for the second group of text in the web page file.

The method, device and system for zooming a font in a web page file according to the embodiments of the disclosure are characterized in that: the text contained in a web page file are classified into a first group of zoomable text (i.e. scalable text) and a second group of unzoomable text, and different zoom operations are respectively performed on the first group of zoomable text and the second group of unzoomable text in the web page file during the subsequent zooming process, so that the problem that text in a web page are overlapped with each other due to zooming is avoided, and the typesetting of the web page is reasonable, without degrading the experience of the user in browsing the web page.

BRIEF DESCRIPTION OF THE DRAWINGS

In order to more clearly illustrate the technical solutions of the embodiments of the disclosure, the drawings used for the description of the embodiments are briefly introduced below. Obviously, the drawings for the following description only show some embodiments of the disclosure, and modifications and substitutions may also be made to these drawings by those skilled in the art without any creative work.

DETAILED DESCRIPTION OF THE EMBODIMENTS

Figure 1:
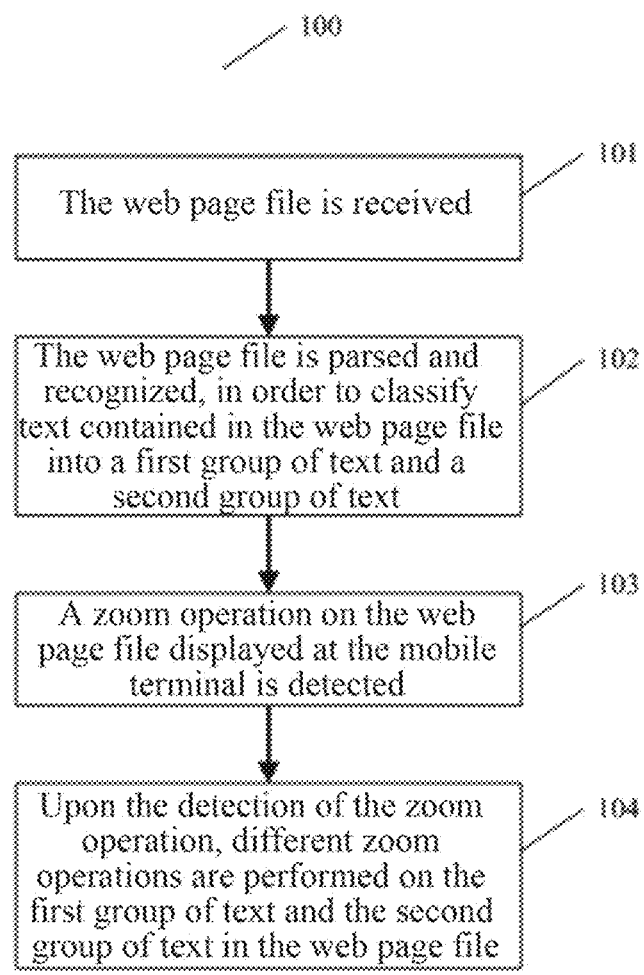
FIG. 1 is a flow chart of a method for zooming a font in a web page file displayed at a mobile terminal according to an embodiment of the disclosure.

The disclosure will be further described in detail below in conjunction with the drawings and the embodiments of the disclosure. It should be understood that the specific embodiments described herein are merely aimed to explain the invention, but not to limit the invention thereto. Besides, it is noted that partial contents relevant to the invention instead of all the contents are shown in the drawings for the sake of brief description.

An embodiment of the disclosure is shown in FIG. 1.

FIG. 1 is a flow chart of a method 100 for zooming a font in a web page file displayed at a mobile terminal according to the present embodiment of the disclosure, and the method 100 includes Steps 101 to 104 below.

In Step 101, the web page file is received.

In the present embodiment, the mobile terminal displaying the web page may receive the web page file from a web server by means of a wireless connection, or locally access the web page file prestored in a built-in memory of the mobile terminal.

In the present embodiment, the above web page file may be any one of web page files with formats such as HTML, XHTML, ASP, PHP, JSP, SHTML, NSP, and XML, or other web page files developed in the future, as long as such web page files can be opened using a browser to browse contents such as pictures, animations and text contained in the web page files. The above wireless connection may be, but not limited to, a 3G connection, a WiFi connection, a Bluetooth connection, a WiMAX connection, a Zigbee connection, an Ultra WideBand (UWB) connection, or other wireless connections developed in the future.

In Step 102, the web page file is parsed and recognized, in order to classify text contained in the web page file into a first group of text and a second group of text.

In the present embodiment, the source code of the web page file received in Step 101 may be parsed by means of a web page parser e.g. a web analyzing software such as HTMLParser or Jsoup, or a website developing tool such as Dreamweaver), to recognize the contents such as web addresses, titles, pictures, and text of the web page. Subsequently, the recognized text in the web page are classified, based on a classification strategy; into the first group of zoomable text (which can be zoomed by a zoom operation) and the second group of unzoomable text (which cannot be zoomed by a zoom operation).

In the present embodiment, the classification strategy can be such that: if the recognized text in the web page come from a title, a functional button (e.g. a "GO" button), or a background picture, the text are categorized into the second group of text; if the recognized text are fixedly located (e.g. absolutely positioned at a fixed position) or cannot be wrapped in the web page, the text are categorized into the second group of text; if the recognized text are limited in height in the web page, the text are categorized into the second group of text; and text in the web page other than those in the second group of text are categorized into the first group of text. It should be noted that the above-mentioned classification strategy is merely exemplary, and it is apparently understood by those skilled in the art that the classification of the text in the web page may be adjusted or even redesigned as desired. For example, the text on the functional button can be classified to the first group of zoomable text to meet a requirement for the displaying effect.

Figure 2:
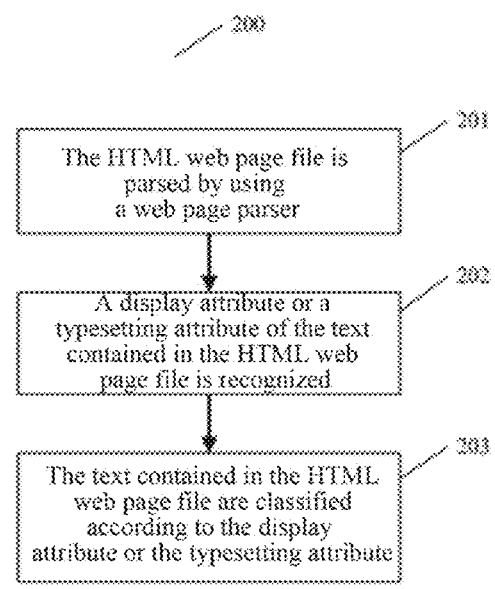
FIG. 2 is a flow chart of a method for classifying text in an HTML web page file.

In the present embodiment, reference is made to FIG. 2, which is a schematic flow chart of a method 200 for classifying text in an HTML web page file. As shown in FIG. 2, an HTML web page file combined with a Cascading Style Sheet (CSS), for example, is parsed and recognized to classify the text contained in the HTML web page file into a first group of zoomable text and a second group of unzoomable text, by Steps 201 to 203 below.

In Step 201, the HTML web page file is parsed by using a web page parser.

In Step 202, a display attribute or a typesetting attribute of the text contained in the HTML web page file is recognized.

In the case of the HTML web page file, the display attribute or the typesetting attribute of the text contained therein is defined by both a CSS tag or an HTML tag and an attribute in the tag. For example, in the case of <td nowrap="nowrap">abcd</td>, which is a piece of source code in the HTML web page file, the content abed between the tags <td> and </td> cannot be wrapped, as defined by the attribute nowrap.

In Step 203, the text contained in the HTML web page file is classified according to the display attribute or the typesetting attribute.

If the display attribute or the typesetting attribute of the text contained in the HTML web page file conforms to any one of the following conditions 1) to 6), the text are classified into the second group of text, and text other than the second group of text are classified into the first group of text. The conditions 1) to 6) are as follows: 1) the typesetting attribute of the text defines that the text cannot be wrapped, e.g., the typesetting attribute of the text is defined by code "white-space: nowrap" in the CSS tag; 2) the display attribute of the text indicates that the text is accompanied by a background picture, e.g., the display attribute of the text is defined by code "background-image:some url" in the CSS tag; 3) the typesetting attribute of the text indicates that the text are absolutely positioned, e.g., the typesetting attribute of the text is defined by code "position:fixed" or "position:absolute" in the CSS tag; 4) the floating direction of the text is different from the typesetting direction of the text, e.g., the floating direction of the text is defined by code "float:right" in the CSS tag, hut the typesetting direction of the text is defined by code "direction:LTR" in the CSS tag; or alternatively, the floating direction of the text is defined by code "float:left" in the CSS tag, but the typesetting direction of the text is defined by code "direction:RTL" in the CSS tag; 5) the alignment direction of the text is different from the typesetting direction of the text, e.g., the alignment direction of the text is defined by code "text-align:right" in the CSS tag, but the typesetting direction of the text is defined by code "direction:LTR" in the CSS tag; or alternatively, the alignment direction of the text is defined by code "text-align:left" in the CSS tag, but the typesetting direction of the text is defined by code "direction:RTL" in the CSS tag; and 6) the number of lines of the displayed text is less than a preset line number, which is preferably three.

In Step 103, a zoom operation on the web page file displayed at the mobile terminal is detected.

In the present embodiment, n the case that the mobile terminal is provided with a touch screen, a trigger signal, which is applied to the touch screen of the mobile terminal and corresponds to the zoom operation on the web page file, is detected by the mobile terminal. The trigger signal may be triggered by a touch operation on the touch screen by a user finger, where the touch operation may be, for example, a touch action on a web page zooming button displayed on the touch screen, or a departing/approaching touch action of user's thumb and forefinger on the touch screen.

Optionally, in the case of a mobile terminal with a front camera, the zoom operation on the web page file displayed at the mobile terminal may be an operation gesture which is applied to the front camera and corresponds to the zoom operation. The operation gesture corresponding to the zoom operation is predefined. When the web page file is displayed on the screen of the mobile terminal, a user gesture is captured by means of the front camera of the mobile terminal, and if the user gesture is subsequently recognized as the operation gesture corresponding to the zoom operation, then the web page file is zoomed.

In Step 104, upon the detection of the zoom operation, different zoom operations are performed on the first group of text and the second group of text in the web page file.

In the present embodiment, the mobile terminal supports the display of fonts with various sizes. For example, in terms of the size of the displayed font, the mobile terminal supports fonts with an extra-large size, a large size, a medium size and a small size, with each of the font sizes corresponding to a certain character size, for example, the extra-large font size corresponds to the third character size, the large font size corresponds to the fourth character size, the medium font size corresponds to the fifth character size, and the small font size corresponds to the sixth character size. Of course, the font sizes may alternatively correspond to the other character sizes, as desired by the technical personnel according to the hardware configuration (e.g., screen resolution) or the application.

In the present embodiment, upon the detection of the zoom operation in Step 103, the first group of text in the web page file is zoomed but the second group of text in the web page file is not zoomed at the mobile terminal. In the method provided by the present embodiment of the disclosure, different zoom operations are performed on text contained in the web page file, so that the problem that the text in the web page are overlapped with each other due to zooming is avoided, and the typesetting of the web page is reasonable.

Figure 3:
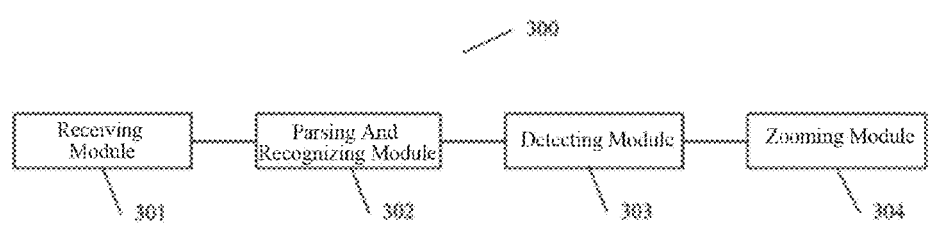
FIG. 3 is a schematic structural diagram of a device for zooming a font in a web page file displayed at a mobile terminal according to another embodiment of the disclosure.

FIG. 3 shows another embodiment of the disclosure.

FIG. 3 is a schematic structural diagram of a device for zooming a font, a web page file displayed at a mobile terminal according to the present embodiment of the disclosure. As shown in FIG. 3, a device 300 for zooming a font in a web page file displayed at a mobile terminal according to the present embodiment includes: a receiving module 301, a parsing and recognizing module 302, a detecting module 303 and a zooming module 304. Among them, the receiving module 301 is configured for receiving a web page file; the parsing and recognizing module 302 is configured for parsing and recognizing the web page file, to classify text contained in the web page file into a first group of zoomable text and a second group of unzoomable text; the detecting module 303 is configured for detecting a zoom operation performed on the web page file displayed at a mobile terminal; and the zooming module 304 is configured for zooming the first group of text in the web page file except for the second group of text in the web page file, upon the detection of the zoom operation.

In the present embodiment, the receiving module 301 of the device 300 may receive the web page file from the web server by means of a wireless connection, or locally access the web page file prestored in a built-in memory of the mobile terminal. In the present embodiment, the above web page file may be any of web page files with formats such as HTML, XHTML, ASP, PHP, JSP, SHTML, NSP, and XML, or other web page files developed in the future as long as such web page files can be opened using a browser to browse contents such as pictures, animations and text contained in the web page files. The above wireless connection may be, but not limited to, a 3G connection, a WiFi connection, a Bluetooth connection, a WiMAX connection, a Zigbee connection, or an Ultra WideBand (UWB) connection, or other wireless connections developed in the future.

In the present embodiment, the source code of the web page file received by the receiving module 301 may be parsed by the parsing and recognizing module 302 in the device 300, to recognize the contents such as web addresses, titles, pictures, and text of the web page. Subsequently, the recognized text in the web page are classified, based on a classification strategy, into the first group of zoomable text (which can be zoomed by a zoom operation) and the second group of unzoomable text (Which cannot be zoomed by a zoom operation). In the present embodiment, the classification strategy can be such that: if the recognized text in the web page come from a title, a functional button (e.g. a "GO" button), or a background picture, the text are categorized into the second group of text; if the recognized text are fixedly located (e.g. absolutely positioned at a fixed position) or cannot be wrapped in the web page, the text are categorized into the second group of text; if the recognized text are limited in height in the web page, the text are categorized into the second group of text; and text in the web page other than hose in the second group of text are categorized into the first group of text. It should be noted that the above-mentioned classification strategy is merely exemplary, and it is apparently understood by those skilled in the art that, the classification of the text in the web page may be adjusted or even redesigned as desired. For example, the text on the functional button can be classified to the first group of zoo able text to meet a requirement for the displaying effect.

In the present embodiment, in the case that the mobile terminal is provided with a touch screen, the detecting module 303 in the device 300 may include a first detecting module, Which is configured for detecting a trigger signal which is applied to the touch screen of the mobile terminal and corresponds to the zoom operation on the web page file. The trigger signal may be triggered by a touch operation on the touch screen by a user finger, where the touch operation may be, for example, a touch action on a web page zooming button displayed on the touch screen, or a departing/approaching touch action of the user's thumb and forefinger on the touch screen.

Optionally, in the case of a mobile terminal with a front camera, the detecting module 303 in the device 300 may further include a second detecting module, which is configured for detecting an operation gesture which is applied to the front camera and corresponds to the zoom operation. The operation gesture corresponding to the zoom operation is predefined. When the web page is displayed on the screen of the mobile terminal, a user gesture is captured by means of the front camera of the mobile terminal, and if the user gesture is subsequently recognized as the operation gesture corresponding to the zoom operation, then the web page file is zoomed.

In the present embodiment, upon the detection of the zoom operation by the detecting module 303, the zooming module 301 in the device 300 zooms the first group of text in the web page, file, but does not zoom the second group of text in the web page file. In the device provided by the present embodiment of the disclosure, different zoom operations are performed on text contained in the web page file, so that the problem that the text in the web page file are overlapped with each other due to zooming is effectively avoided.

Figure 4:
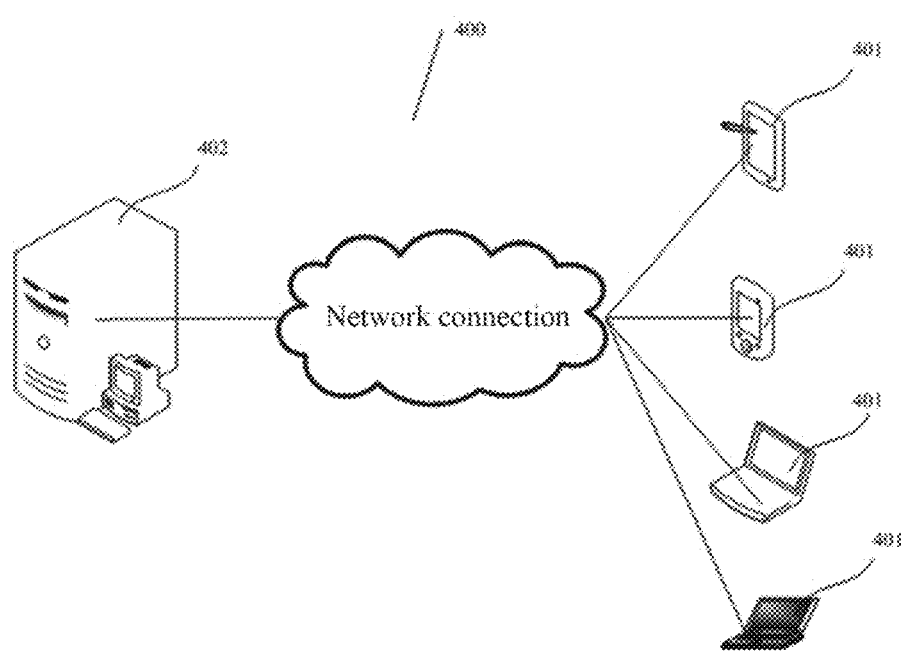
FIG. 4 is a schematic structural diagram of a system for zooming a font in a web page file according to yet another embodiment of the disclosure.

FIG. 4 shows yet another embodiment of the disclosure.

FIG. 4 is a schematic structural diagram of a system for zooming a font in a web page file according to the present embodiment of the disclosure. As shown in FIG. 4, a system 400 for zooming a font in a web page file according to the present embodiment includes: a server 402 (e.g. a web server used for hosting websites) and at least one client terminal 401, where the client terminal 401 may be connected to the server 402 by means of a wireless connection. In the present embodiment, the server 402 is configured to transfer a web page file to the client terminal 401; and the client terminal 401 is configured to parse and recognize the web page file, to classify text contained in the web page file into a first group of zoomable text and a second group of unzoomable text; subsequently, the client terminal 401 is configured to detect a zoom operation performed on the web page displayed; upon the detection of the zoom operation, the client terminal 401 is configured to zoom the first group of text in the web page file except for the second group of text in the web page file.

The present embodiment of the disclosure further provides a storage medium containing computer-executable instructions, which, when executed by a computer processor, are configured to perform the above method for zooming a font in a web page file displayed at a mobile terminal, wherein the method includes steps of:

receiving a web page file;

parsing and recognizing the web page file, to classify text contained in the web page file into a first group of zoomable text and a second group of unzoomable text;

detecting a zoom operation performed on the web page file displayed at a mobile terminal; and upon the detection of the zoom operation, zooming the first group of text in the web page file except for the second group of text in the web page file.

The mobile terminal or client terminal in the disclosure may he any one of a tablet PC, a handheld computer, a Personal Digital Assistant (PDA), a handheld electronic processing to device, a smart phone combining functions of PDA and mobile phone, a navigation device, and any other portable electronic devices capable of displaying web pages and automatically processing information, The above-mentioned mobile terminal or client terminal may be further configured to be connected to a database or another mobile terminal or client terminal through a wired or wireless connection.

With the technical solutions according to the disclosure, the text contained in a web page file are classified into a first group of zoomable text and a second group of unzoomable text, and different zoom operations are respectively performed on the first group of text and the second group of text in the web page file during the subsequent zooming process, so that the problem that the text in a web page file are overlapped with each other due to zooming is avoided, and the typesetting of the web page is reasonable, without degrading the experience of the user in browsing the web page.

It is noted that the above preferred embodiments and the technical principle are described for illustrating the present invention. It should be understood by those skilled in the art that the invention is not limited to the preferred embodiments. Variations, modifications and substitutions can be made by those skilled in the art without departing from the scope of the protection of the invention. Therefore, although the invention has been illustrated in detail through the above embodiments, the invention is not merely limited to the embodiments, and other equivalent embodiments can be included without departing from the concept of the invention, and the scope of the present invention is defined by the attached claims.

What is claimed is:

1. A method for zooming a font in a web page file displayed at a mobile terminal, comprising steps of:

receiving a web page file;

parsing and recognizing the web page file to classify text contained in the web page file into a first group of zoomable text and a second group of unzoomable text;

detecting a zoom operation performed on the web page file displayed at a mobile terminal; and upon the detection of the zoom operation, zooming the first group of zoomable text in the web page file but not the second group of unzoomable text in the web page file, wherein the web page file is an HTML web page file; and wherein parsing and recognizing the web page file to classify text contained in the web page file into the first group of zoomable text and the second group of unzoomable text comprises:

parsing the web page file;

recognizing a display attribute or a typesetting attribute of the text contained in the web page file; and classifying the text contained in the web page file into the second group of unzoomable text in response to determining that the display attribute or the typesetting atttribute of the text conforms to a preset condition, and classifying the text other than the second group of text into the first group of zoomable text, wherein, the preset condition comprises at least one of: the typesetting attribute of the text defines that the text cannot be wrapped; the display attribute of the text indicates that the text is accompanied by a background picture; the typesetting attribute of the text indicates that the text are absolutely positioned; the floating direction of the text is different from the typesetting direction of the text; the alignment direction of the text is different from the typesetting direction of the text; and the number of lines of the displayed text is less than a preset line number.

2. The method according to claim 1, wherein detecting the zoom operation performed on the web page displayed at the mobile terminal comprises:

detecting a trigger signal which is applied to a touch screen of the mobile terminal and corresponds to the zoom operation.

3. The method according to claim 1, wherein detecting the zoom operation performed on the web page displayed at the mobile terminal comprises:
   detecting an operation gesture which is applied to a front camera of the mobile terminal and corresponds to the zoom operation.

4. The method according to claim 1, wherein classifying performed by a device at a mobile terminal.

5. A system for zooming a font in a web page file, comprising a server and at least one client terminal, wherein:
   the server is configured to transfer a web page file to the client terminal;
   the client terminal is configured to parse and recognize the web page file, to classify the text contained in the web page file into a first group of zoomable text and a second group of unzoomable text;
   the client terminal is further configured to detect a zoom operation performed on the web page file displayed; and
   upon the detection of the zoom operation, the client terminal zooms the first group of zoomable text in the web page file but not the second group of text in the web page file,
   wherein the web page file is an HTML web page file,
   wherein the parsing and recognizing the web page file to classify text contained in the web page file into the first group of zoomable text and the second group of unzoomable text comprises:
      parsing the web page file;
      recognizing a display attribute or a typesetting attribute of the text contained in the web page file; and
      classifying the text contained in the web page file into the second group of unzoomable text in response to determining that the display attribute or the typesetting attribute of the text conforms to a preset condition, and classifying the text other than the second group of text into the first group of zoomable text;
      wherein, the preset condition comprises at least one of: the typesetting attribute of the text defines that the text cannot be wrapped; the display attribute of the text indicates that the text is accompanied by a background picture; the typesetting attribute of the text indicates that the text are absolutely positioned; the floating direction of the text is different from the typesetting direction of the text; the alignment direction of the text is different from the typesetting direction of the text; and the number of lines of the displayed text is less than a preset line number.

6. A non-transitory storage medium containing computer-executable instructions, which, when executed by a computer processor, are configured to perform a method for zooming a font in a web page file displayed at a mobile terminal, wherein the method comprises steps of:
   receiving a web page file;
   parsing and recognizing the web page file, to classify text contained in the web page file into a first group of zoomable text and a second group of unzoomable text;
   detecting a zoom operation performed on the web page file displayed at a mobile terminal; and
   upon the detection of the zoom operation, zooming the first group of text in the web page file but not the second group of unzoomable text in the web page file,
   wherein the web page file is an HTML web page file,
   wherein the parsing and recognizing the web page file to classify text contained in the web page file into the first group of zoomable text and the second group of unzoomable text comprises:
      parsing the web page file;
      recognizing a display attribute or a typesetting attribute of the text contained in the web page file; and
      classifying the text contained in the web page file into the second group of unzoomable text in response to determining that the display attribute or the typesetting attribute of the text conforms to a preset condition, and classifying the text other than the second group of text into the first group of zoomable text;
      wherein, the preset condition comprises at least one of: the typesetting attribute of the text defines that the text cannot be wrapped; the display attribute of the text indicates that the text is accompanied by a background picture; the typesetting attribute of the text indicates that the text are absolutely positioned; the floating direction of the text is different from the typesetting direction of the text; the alignment direction of the text is different from the typesetting direction of the text; and the number of lines of the displayed text is less than a preset line number.

7. The method according to claim 6, wherein detecting the zoom operation performed on the web page displayed at the mobile terminal comprises:
   detecting a trigger signal which is applied to a touch screen of the mobile terminal and corresponds to the zoom operation.

8. The method according to claim 6, wherein detecting the zoom operation performed on the web page displayed at the mobile terminal comprises:
   detecting an operation gesture which is applied to a front camera of the mobile terminal and corresponds to the zoom operation.

* * * * *